United States Patent Office 3,452,822
Patented July 1, 1969

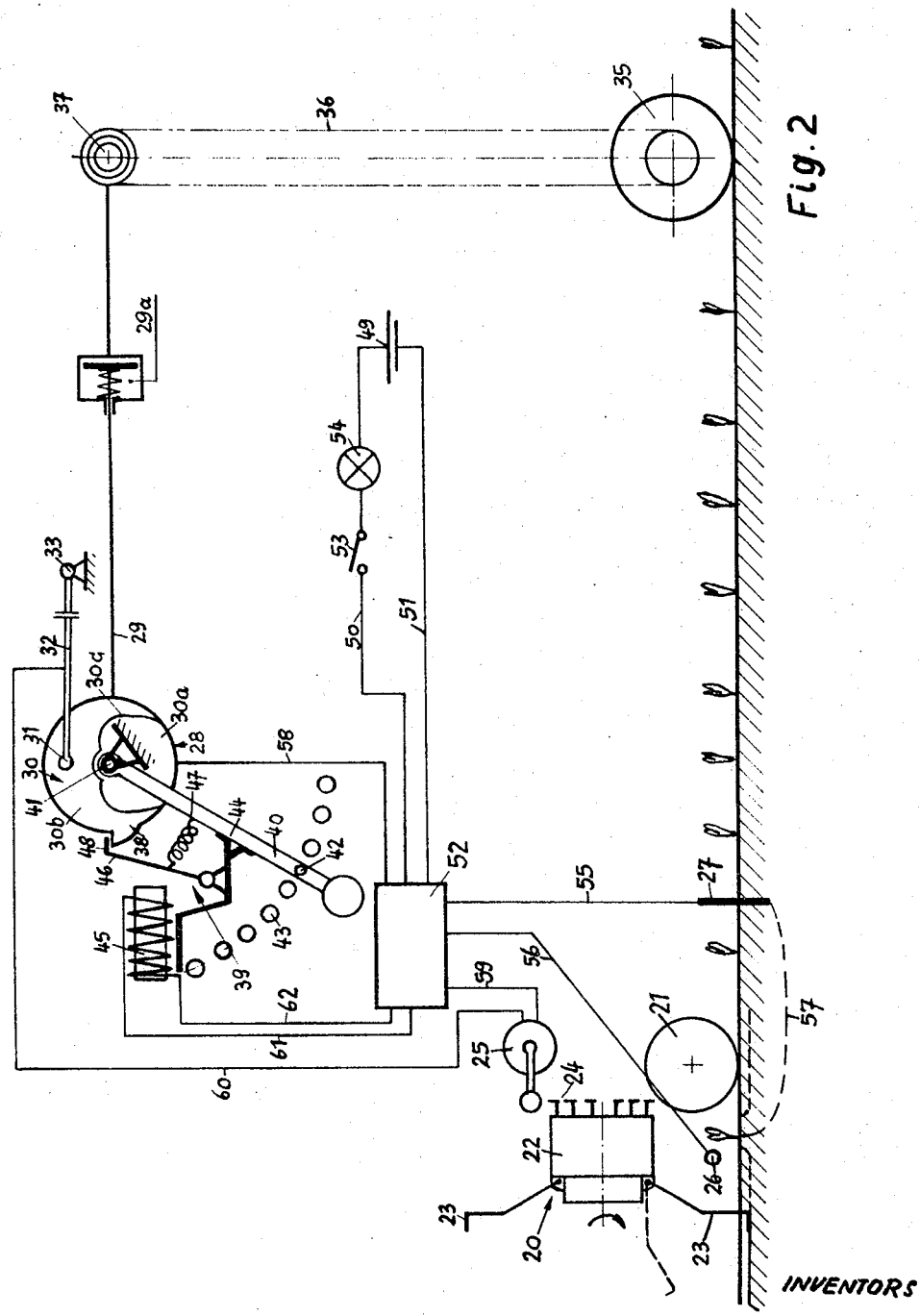

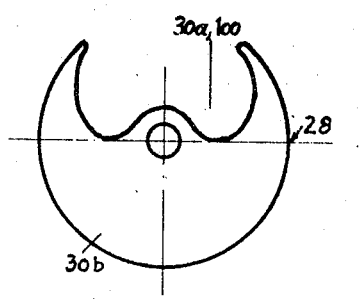
Fig. 6
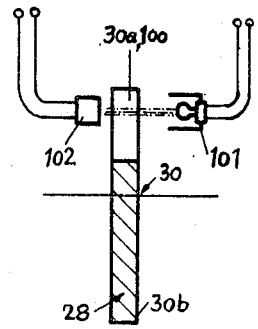
Fig. 7
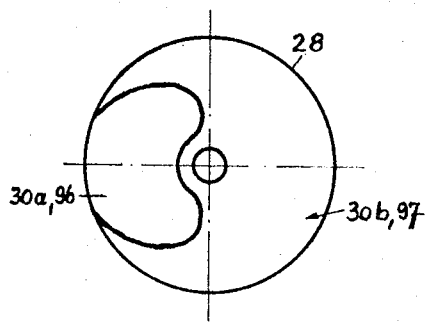
Fig. 4
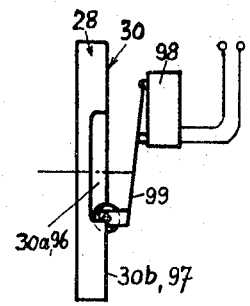
Fig. 5
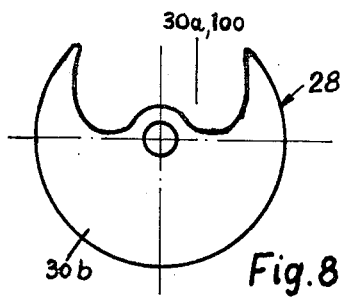
Fig. 8
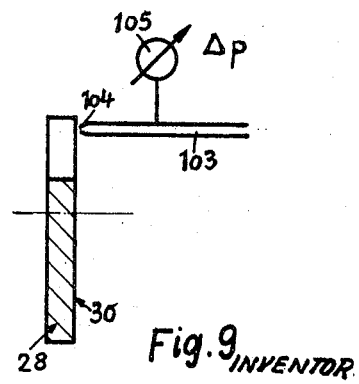
Fig. 9

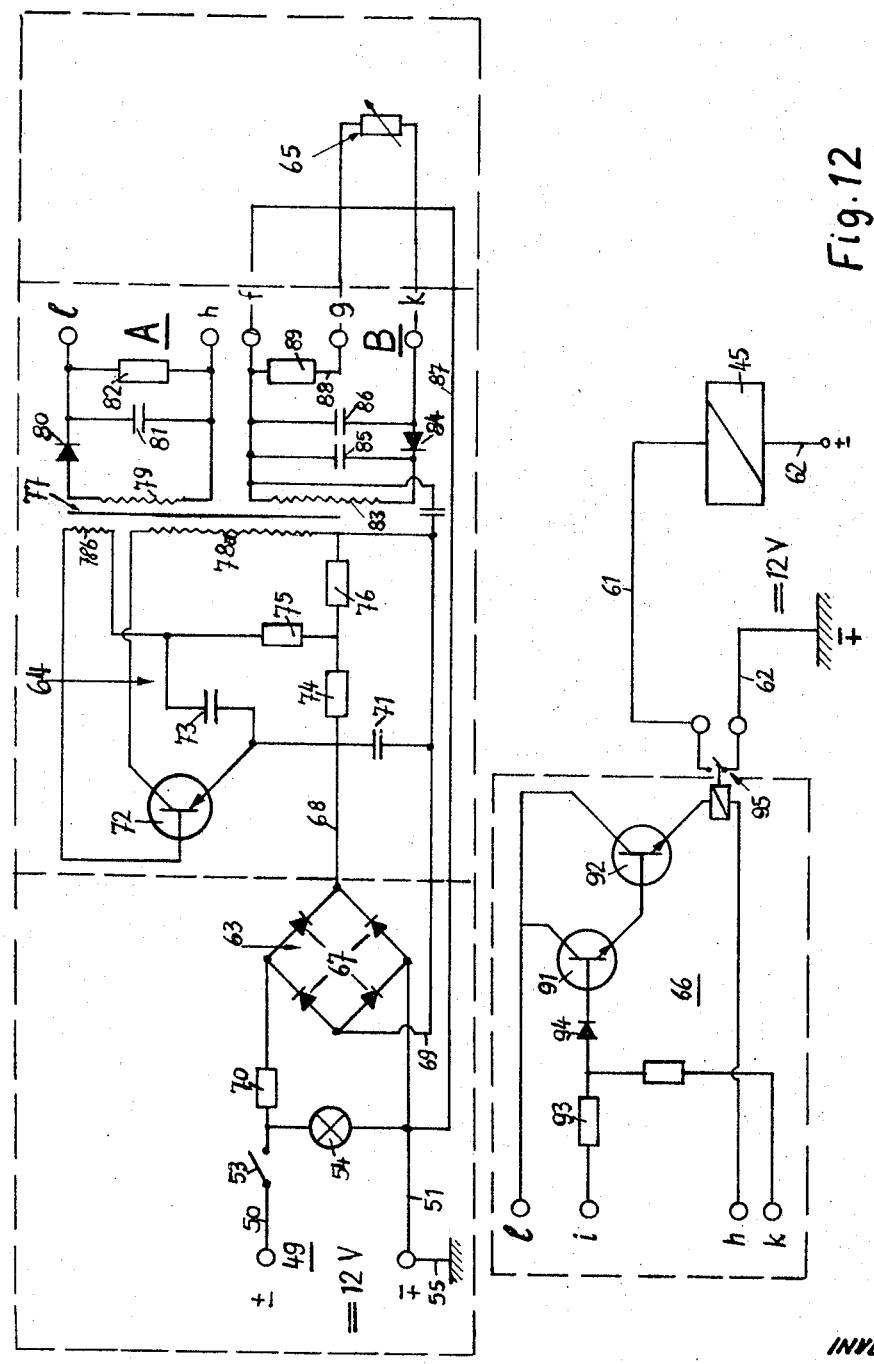

3,452,822
CONTROL DEVICE FOR APPARATUS FOR
THINNING PLANTS IN A ROW
Heinrich Gugenhan, 53, Schulstrasse, Duren, Germany, and Arnold Gego, Gut Scheuer, Laurensberg, near Aachen, Germany
Filed May 10, 1966, Ser. No. 549,033
Claims priority, application Germany, May 12, 1965, F 46,033
Int. Cl. A01b 63/00, 33/00, 35/00
U.S. Cl. 172—6                                    16 Claims

ABSTRACT OF THE DISCLOSURE

A control for a row cultivator having cultivating tool means selectively activatable along specified portions of a row and deactivatable along other portions of a row by the activation of a rotary magnet with the control including a rotary control member driven by a ground engaging means at a rate proportional to the speed of movement of the cultivator along the row. The rotary control disc having first and second adjacent sectors each having a varying arcuate extent at varying radial positions with respect to its axis of rotation and a detector switch means mounted for radial adjustment adjacent one side the rotating disc for detecting each of the areas to activate the rotary magnet when the first area is detected with a deactivatable stop engaging the rotary control member for stopping same in a position with the second area being detected so that the cultivating tool means will continuously be activated but including a plant detecting contact which deactivates the stop means upon detection of a plan so that the control member can rotate the second area to a position to be detected by the detector switch means to consequently deactivate the cultivating tool means so that the cultivating tool means will not engage and damage or destroy the plant.

---

The invention relates to a control device for apparatus for thinning, hoeing or spraying plants standing in a row, comprising control elements which are arranged on a driven shaft and actuate the switching means for the working implements.

When thinning, hoeing or spraying plants standing in a row it is necessary alternately to work along a stretch in which the plants are thinned, hoed or sprayed (working stretch) and to move along a certain stretch containing at least one plant on which no work is to be carried out (protected zone). In order to ensure unhindered development of the plants remaining in the protected zone, the working stretches must have at least a certain length, namely the minimum working stretch. If, on the other hand, there is no plant behind the minimum working stretch, the working stretch must extend beyond the minimum working stretch up to some distance before the next following plant. The areas formed by the protected zones are blocks comprising a front part situated in front of the plants and a rear part behind these plants.

Various types of apparatus are known for thinning, hoeing or spraying plants in a row. For example, apparatus equipped with rotary, oscillating or rocking hoeing tools are used for thining and hoeing plants in a row, and apparatus equipped with a spray device are used for spraying plants arranged in a row. For working along the working stretch but not along the protected zone it is necessary to have a control device for the implements provided on the apparatus for thinning, hoeing or spraying.

A control device for apparatus for thinning, hoeing or spraying plants standing in a row comprising control members which are arranged on a driven shaft and which actuate the switching means for the working implements is already known. The control members of this control device are cam plates which are arranged to be replaceable on their drive shaft. These cam plates, however, can only effect control over specific lengths of the protected zones and working stretches. If it is desired to use the apparatus for protected zones and working stretches of different lengths, the cam plates used in the known control device have to be exchanged, which is a great disadvantage.

According to a hitherto unpublished proposal a control device of the type in question is provided in which the control members are pairs of cam plates. The two cam plates forming a pair in each case are arranged to be rotatable relatively to each other so that it is possible to vary the length of the working stretch and of the protected zone when working with the apparatus. However, these cam pairs render the control device very complicated, subject to disturbances and expensive.

It is the object of the invention to provide a control device which is an improvement on the known and proposed control device. In particular, the invention aims to provide a control which can be adjusted in a simple manner to working with different lengths of working stretches and protected zones. Furthermore, the control device is to have a very wide range of adjustment. In addition, it should be possible by means of the invention to vary the beginning of the protected zone in relation to the plants situated in the zone. Furthermore, it should be readily adaptable to apparatus designed to work on several rows. Lastly, it should be simple, trouble-free in operation, versatile and inexpensive.

To solve this problem the invention provides that in the new control device one or more control discs each comprising two sectors is or are provided as the control members and that switching means are arranged laterally to one end surface of each control disc as well as in a radially adjustable distance from the axis of rotation of the disc, the said switching means exerting a switching effect on the tool-actuating devices when cooperating with one disc sector but no switching effect when cooperating with the other disc sector. The lengths of arc of one disc sector are to correspond to the minimum working stretch and the lengths of arc of the other disc sector to the protected zone. This design makes it possible to effect control for different lengths of protected zones and working stretches with only one control disc.

According to the invention it is further provided that in the new device, the ratio of lengths of arc of the two disc sectors differs in dependence upon their radius. In conjunction with the radially adjustable arrangement of the switching means, this design of the discs makes it possible to alter the ratio of length of protected zone to length of working stretch.

According to the invention, the new device further provides a stop device for each control disc, which stop device holds the corresponding disc in an angular position at which a switching effect which keeps the working implements in their operative position is exerted by the switching means and which stop device does not release the disc until a plant which is not to be treated or removed is detected.

By means of this stop device, the working process is continued beyond the minimum working stretch if there is no plant immediately behind the minimum working stretch, and the work is stopped only at some distance before the next following plant. According to the invention, the angular position of the control disc in which the latter is stopped by the stop device is variable. It is thereby possible to vary the position of beginning of the protected zones with reference to the plants situated in these zones.

The invention provides various advantageous embodiments for the construction of the control discs and of the switching means cooperating therewith.

According to one embodiment, that end surface of each control disc which faces the switching means is streamlined in the region of the sector corresponding to the protected zone and is not streamline in the region of the sector corresponding to the minimum working stretch and the switching means are formed by a sliding contact which is in engagement with the end surface of the disc. In this embodiment, the control discs are preferably made of dielectric material and covered with a metal layer in the region of the sector corresponding to the protected zone.

In another embodiment, that end surface of each disc which faces the switching means is a relief surface having a depression in the region of the sector corresponding to the protected zone and an elevation in the region of the sector corresponding to the minimum working stretch and the switching means are formed by a microcontact which has an actuating lever engaging with the relief surface of the disc.

In another embodiment, the end surface of each control disc is a corresponding relief surface but in this embodiment the switching means are pneumatic and comprise a nozzle ending close to the relief surface which forms the end surface of the disc.

According to a further embodiment, each control disc has a recess in the region of the sector corresponding to the protected zone. In this embodiment, the switching means consist of a photoelectric cell and a source of light arranged on either side of the control disc.

In yet another embodiment, each control disc again has a recess in the region of the sector corresponding to the protected zone. In this embodiment, however, pneumatic switching means are provided which have a nozzle ending just in front of the end surface of the disc.

In all embodiments of the control disc and switching means, the switching means act on the working implements either directly or via some further switching elements and they keep the implements in their operative position in the region of the working stretch and in the position of rest in the region of the protected zone.

According to the invention, each control disc is driven by way of a slip coupling. The individual control discs can easily be stopped by means of this slip coupling. Moreover, by virtue of the slip couplings, the control discs can be driven independently of each other.

The shaft which carries the control disc(s) is driven according to the invention by a flat hoop which rolls over the ground, by way of a chain or belt drive with a cone pulley. By using a flat hoop rolling over the ground for driving the shaft for the control disc, the control device is made to function in dependence upon the path over which the apparatus moves. On the other hand, the use of a cone pulley or step wheel in the chain or belt drive makes it possible to vary the total stretch composed of protected zone and minimum working stretch or the minimum distance between the starting points of the protected zones.

For stopping the control disc(s), the invention further provides that each control disc is provided with a stop cam on its circumference and that the stopping device for each control disc is provided in the form of a relay with an interrupter stirrup which is under the action of a spring and which engages with the stop cam when the relay is in the inoperative position but disengages when the relay is actuated. To enable variation of the angular position in which the control discs are stopped by the stop device, it is further provided according to the invention that the relay and the interrupter arm of the stop device(s) are arranged on a frame which is tiltable about the axis of the control disc.

As regards actuation of the stop relay, it is provided according to the invention that each stop relay is actuated by an electric circuit controlled by a current which flows through a feeler circuit and is reinforced by an impedance converter. This impedance converter preferably has a microcontact to which the relay circuit is connected. Each feeler circuit comprises in known manner a feeler which is moved along the rows of plants by the actuating device and an earth contact.

The operating voltage for all the impedance converters reinforcing the feeler circuit currents is provided according to the invention by a source of direct voltage via a voltage converter followed by a rectifier, with the consequence that the expenditure for providing the operative voltage for all impedance converters is only slight. In addition, a diode arrangement is advantageously provided between the source of direct voltage and the voltage converter. This diode arrangement has the effect that the polarity of the source of voltage for the voltage converter is immaterial and therefore no damage can result from faulty polarity.

As regards the construction of the voltage converter it is further provided according to the invention that it has a transformer with two secondary coils, one secondary coil supplying the operative voltage for all impedance converters and the other secondary coil supplying the feeler circuits. This design provides a simple means for supplying all the impedance converters and feeler circuits.

The invention further provides a potentiometer connected in parallel with that secondary coil of the voltage converter which feeds the feeler circuits. This potentiometer influences the transformer of the voltage converter and hence the sensitivity of the feeler circuits which are supplied by the secondary coil of the converter. It is therefore also possible to adapt the control device to the moisture of the ground and moisture content of the plants by means of the potentiometer and, for example, to hoe out plants of low moisture content, such as weeds, and to leave plants of high moisture content, such as beets.

Lastly, in the new control device it is possible to provide, instead of each control disc, a control roller comprising two different circumferential parts which overlap in the axial direction and the line of contact of which extends at a constant or varying angle to the transverse direction of the rollers. The control device may in that case have switching means which cooperate with the circumference of the roller.

In an embodiment of this type, the circumferential surface of the control roller(s) will be designed according to the end surface of the control discs. Furthermore, in this embodiment the switching means employed are similar to those employed with control discs. The remaining structural features of the control device with control discs are also substantially the same in the embodiment in question.

The accompanying drawings show constructional examples illustrating the invention diagrammatically.

FIG. 2 shows an apparatus for thinning plants standing in a row and, on an enlarged scale, a control device for the same;

FIG. 4 is a top plan view of another control disc;

FIG. 5 shows the control disc of FIG. 4 and a microcontact cooperating therewith, in side view;

FIG. 6 shows another control disc in top plan view;

FIG. 7 shows the control disc of FIG. 6 and a source of light and photoelectric cell cooperating therewith, partly in section and partly in side view;

FIG. 8 shows a top plan view of a control disc corresponding to FIG. 6;

FIG. 9 shows the control disc of FIG. 8 and pneumatic switching means cooperating therewith, partly in section and partly in side view;

FIG. 12 is a circuit diagram of switching elements of the control device.

Figure 1:
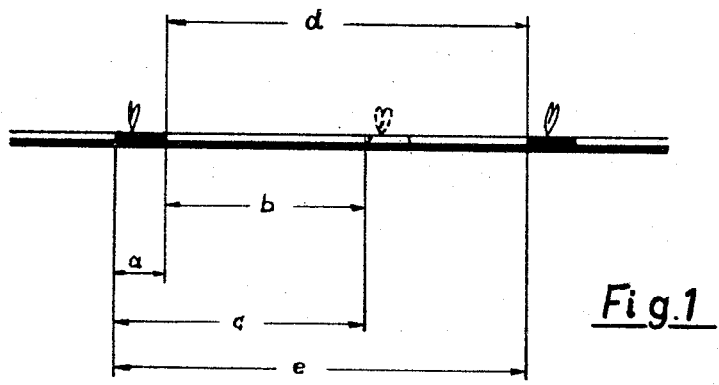
FIG. 1 shows a row of plants to be treated.

FIG. 1 illustrates the situation in a plant row when the plants standing in a row are to be thinned such that plants are preserved only at a minimum distance apart and the other plants are removed. In this figure, $a$ indicates the protected zone or length of block in which the plants are left to stand and no work is carried out; $b$ indicates the minimum working stretch along which any plants present are removed. The protected zone $a$ and minimum working stretch $b$ together form the minimum block distance $c$. If there is no plant immediately behind the minimum working stretch $b$, the work is continued up to some distance before the next plant is reached. This may result in an effective working stretch $d$ and consequently an effective block distance $e$.

The apparatus illustrated in FIG. 2 for thinning plant rows and the associated control device are designed only for a single row of plants. Apparatus and control device for simultaneously working on several plant rows have been omitted for the sake of clarity.

The apparatus 20 for thinning the plant row is conventional and is of the type illustrated in U.S. Patent No. 3,361,217 of applicants. The apparatus 20 runs over the ground by means of wheels 21 and has a rotary tool disc 22. Hoeing implements 23 are arranged concentrically and in stellate formation on this tool disc 22. These hoeing tools 23 can execute swinging movements perpendicularly to the plane of rotation of the tool disc 22 between end positions situated radially and parallel to the axis of rotation of the tool disc. The operative position of the hoeing tools 23 is shown in full lines and their inoperative position in dotted lines. The pawls 24 are provided for swinging the hoeing tools 23 from their operative into their inoperative position and the return movement into the operative position is effected by springs (not to be seen) situated inside the tool disc 22. A rotary magnet 25 is provided for actuating the locking pawls 24. This magnet is set into operation by the control device.

The thinning apparatus 20 is provided in addition with an electric feeler 26 which is situated at some distance above the ground and comes into engagement with the plants of the row that is to be thinned. In addition, the thinning apparatus 20 is provided with a slide shoe 27 which acts as earth contact.

Figure 3:
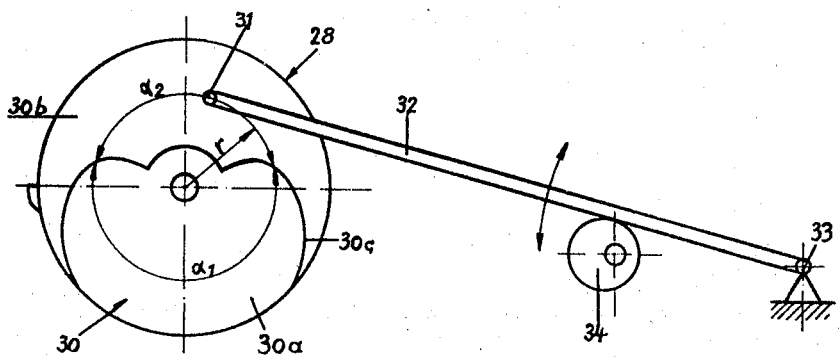
FIG. 3 shows a control disc and the associated switching means of the control device of FIG. 2 in partial view.

The control device has a control disc 28 being arranged on a drive shaft 29. The control disc 28 consists of dielectric material. The end surface 30 facing the observer is subdivided into two control sectors 30a and 30b. These two sectors of the disc are limited by a curved symmetrical line 30c. The sector 30a is covered with a metal layer (not shown) and is therefore electrically conductive. As shown in FIG. 3, its length of arc $\alpha_1$ corresponds to the protective zones $a$ of the plant rows that are to be treated. The sector 30b is not electrically conductive. Its lengths of arc $\alpha_2$ corresponds to the minimum working working stretches $b$ of the plant rows that are to be treated.

Laterally to the end surface 30 of the control disc 28 is a sliding contact 31 which is in engagement with the disc. This sliding contact 31 is arranged at the free end of a pivot lever 32 the other end of which is attached to a bearing 33. Underneath the lever 32 is a cam 34 which acts on it, as shown in FIG. 3. By means of this cam 34, the radial distance $r$ of the sliding contact 31 from the axis of rotation of the control disc 28 can be varied.

When the control disc 28 rotates, its sectors 30a and 30b slide along the sliding contact 31. The magnitudes of the lengths of arc $\alpha_1$ and $\alpha_2$ of the sectors 30a and 30b which pass over the sliding contact 31 during rotation depend upon the radial distance $r$ of the sliding contact 31 from the axis of rotation of the control disc.

The drive shaft 29 of the control disc 28 is driven by way of a slip coupling 29a. For driving the drive shaft 29 via the slip coupling 29a there is provided a flat wheel 35 which is connected to the thinning apparatus 20 and acts on a stepped pulley 37 via a drive band 36. This pulley 37 is mounted on the drive shaft 29 in front of the coupling 29a. Since the wheel 35 is constantly pulled when rolling over the ground, no earth adheres to it and its diameter therefore remains constant. The drive transmitted from the wheel 35 to the shaft 29 of the control disc 28 is therefore always an accurate reflection of the contour of the path ground. The transmission ratio of the drive from the wheel 35 to the shaft 29 can be varied by means of the stepped pulley 37.

The control disc 28 has a stop cam 38 on its circumference. In addition, a stop device 39 is provided for it. The stop device 39 is arranged on a tilting frame 40 which is swingably mounted on a bearing 41 coinciding with the axis of rotation of the control disc 28, and it can be fixed in different angular positions by means of a pin 42 mounted on it and a number of apertures 43 arranged on a circular arc on the housing of the control device.

A support 44 is arranged on the tilting frame 40 of the stop device 39. This support 44 carries a stop electromagnet 45 and interrupter stirrup 46. The stop electromagnet 45 is mounted in a fixed position on the support 44. The stirrup 46, on the other hand, is swingably mounted on the support 44 and is under the action of the stop electro-magnet 45 and under the action of a tension spring 47 provided between the stirrup 46 and the pivot lever 40. At its free end, the stirrup 46 has an abutment 48 which bears against the control disc 28 under the action of the spring 47 unless the stirrup 46 is pulled back from the control disc 28 by the electromagnet 45.

When the stirrup 46 bears with its abutment 48 against the circumference of the control disc 28, the stop cam 38 of the disc comes into engagement with the abutment 48 when the disc rotates. Rotation of the control disc 28 is therefore stopped. A stopping of the disc is possible on account of the slip coupling 29a. Rotation of the control disc 28 can only continue when the stop electro-magnet 45 pulls the stirrup 46 towards itself to release the stop cam 38.

The source of current of the control device is a 12 volt battery 49. This is connected to a switchbox 52 by leads 50 and 51. A main switch 53 and control lamp 54 are also connected into the lead 50.

Another lead 55 extends from the switchbox 52 to the slide shoe 27. The electric feeler 26 is connected to the switchbox 52 by a lead 56. When the feeler 26 comes into contact with a plant, the circuit between feeler 26 and slide shoe 27 is closed through the earth, as indicated in the broken line 57 in FIG. 2. The feeler circuit may also be closed.

Another lead 58 leads from the switchbox 52 to the drive shaft 29 which in turn is electrically connected to the metal layer of the sector 30a of the control disc 28. Furthermore, a lead 59 leads from the switchbox 52 to the rotary magnet 25 of the thinning apparatus 20. A lead 60 is connected to the rotary magnet 25 at one end and to the lever 32 of the sliding contact 31 at the other end. When connection is established between the lead 58 and the lead 60 by engagement of the sliding contact 31 with the sector 30a of the control disc 28, the rotary magnet 25 is actuated and the hoeing tools 23 are thereby moved into their inoperative position.

Lastly, the stop electro-magnet 45 is connected to the switchbox 52 by leads 61 and 62.

Figure 11:
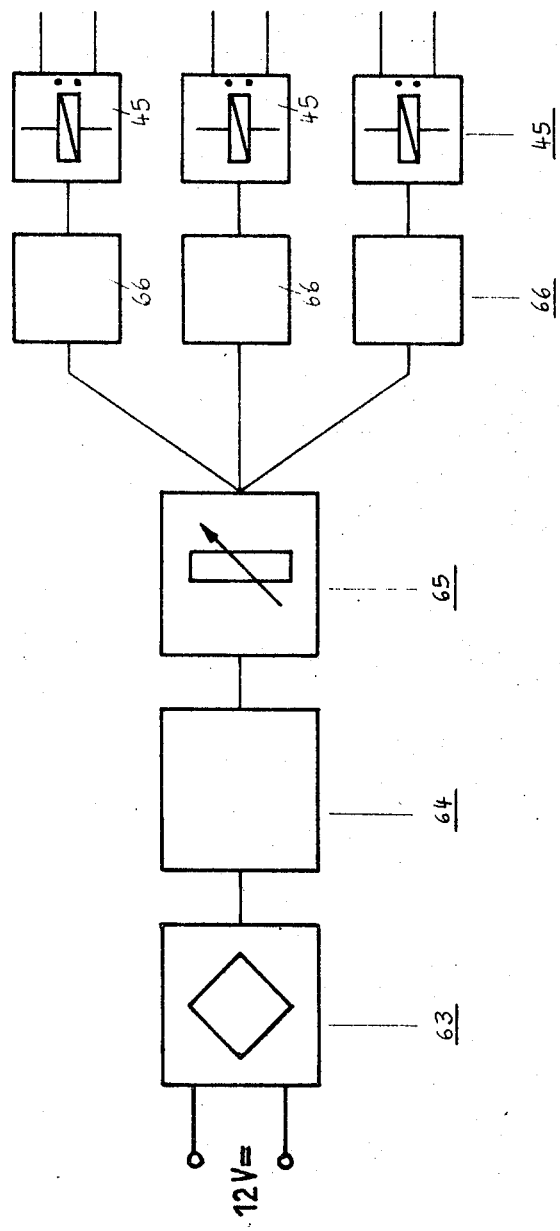
FIG. 11 is a block circuit diagram of different switching elements of the control device.

The switchbox 52 contains a diode arrangement 63, a voltage converter 64, a potentiometer 65 and one or more current amplifier impedance converters 66 to each of which is connected a stop electro-magnet 45. The block circuit diagram of FIG. 11 shows the arrangement of these circuit elements and the sketch in FIG. 12 shows their detailed construction.

The diode arrangement 63 is attached to the leads 50 and 51 from the direct voltage source 49. This diode arrangement 63 has four rectifiers 67 which are connected together in such a manner that the positive pole is always on the lead 68 leading from them and the negative pole on the lead 69 connected to them, regardless of the polarity of the voltage source 49. A safety fuse 70 is connected into the lead 50 which extends from the voltage source 49 to the rectifier 67.

The leads 68, 69 lead to the voltage converter 64. The lead 68 ends above a condenser 71 and the lead 69 below this condenser 71. Connected into the voltage converter 64 are a transistor 72, a further condenser 73 and three resistors 74, 75 and 76. In addition, the voltage converter 64 comprises a transformer 77 with primary coil 78a and primary coil 78b and two secondary coils 79 and 83. These circuit elements convert the voltage by virtue of their arrangement and circuit connections. The transistor 72 and transformer 77 together act as a generator which produces a voltage of high frequency, the height of the frequency being determined by the primary windings 78a and 78b. The resistors 74, 75 and 76 act as voltage dividers.

Whilst the winding of the primary coils 78a, 78b of the transformer 77 depends on the voltage conversion to be effected by them and the desired frequency of the alternating current that is to be produced, the windings of the secondary coils 79, 83 of the transformer 77 can be selected freely according to the desired secondary voltages.

The secondary coil 79 of the transformer 77 supplies the operative voltage A for the impedance converter or converters 66 and for this purpose it has the terminals $l$ and $h$. A rectifier 80, condenser 81 and resistor 82 are arranged in the appropriate circuit, the rectifier 80 being connected in series and the condenser 81 and resistor 82 in parallel.

The feeler circuit or circuits are supplied at a voltage B by the secondary coils 83 of the transformer 77. A rectifier 84 is connected in series and two condensers 85, 86 are connected in parallel into the leads supplying the feeler circuit. The leads for the feeler circuit or circuits end in terminals $f$ and $k$. The terminal $f$ is connected to the earth contact 27 through a lead 87 and leads 51 and 55.

A lead 88 containing a resistor 89 extends from the terminal $f$ to another terminal $g$. The potentiometer 65 is connected to this terminal $g$ and to the terminal $k$. The voltage B across the terminals $f$ and $k$ and hence also the sensitivity of the feeler circuits can be adjusted by means of the potentiometer 65.

Several impedance converters 66 can be connected to the terminals $l$ and $h$ which are connected to the secondary coil 79. It is also possible to attach several feeler circuits to the terminals $f$ and $k$ which are connected to the secondary coil 83. The number of impedance converters and feeler circuits depend on the number of plant rows that are to be treated simultaneously.

Each impedance converter 66 has two transistors 91 and 92. The operative voltage from the terminal $l$ is applied against the collector of these transistors 91 and 92. The feeler circuit is connected to the base of the transistor 91 through a resistor 93 and a rectifier 94. For this purpose, a terminal $i$ is provided for the lead 56 which is attached to the feeler 26. Current flowing through the feeler circuit is amplified by the transistor 91. The emitter of the transistor 91 leads to the base of the transistor 92. This produces further amplification of the current of the feeler circuit. The emitter of the transistor 92 leads to the coil of a microcontact 95 and from there to the terminal $h$.

When contact is made with a plant, the microcontact 95 is closed by the current then flowing through the feeler circuit and the amplification of this current. Consequently, current flows through the leads 61, 62 connected to the stop electro-magnet 45 and as a result, the electromagnet 45 is energised and pulls up the interrupter stirrup 46.

Provided the control disc 28 was stopped by the abutment 48 of the interrupter stirrup 46, as illustrated in FIG. 2, the disc is released by the movement of the interrupter lever 46. This enables the control disc 28 to continue its rotation. The sliding contact 31, which is approximately in the middle of the disc sector 30b corresponding to the minimum working stretch when the control disc 28 is stopped, at first, remains in engagement with this sector of the disc as rotation of the control disc 28 continues. Consequently, the hoeing tools 23 of the thinning apparatus 20 also at first remain in their operative position. However, as rotation of the control disc 28 continues, its disc sector 30a corresponds to the protected zone reaches the sliding contact 31 and the rotary magnet 25 is energised by the current which then flows and it swings the hoeing tools 23 from their operative into their inoperative position by means of the pawls 24.

This operative state continues until the disc sector 30a of the control disc 28 has passed the sliding contact 31. As soon as the disc sector 30b of the control disc 28 again engages with the sliding contact 31, the supply of current to the rotary magnet 25 is cut off and consequently the hoeing tools 23 swing back from their inoperative position into their operative position.

In the course of the rotation of the control disc 28 which now follows, the stop cam 38 of the disc again comes into engagement with the abutment 48 of the stirrup 46 so that the control disc 28 is again stopped unless the feeler 26 has made contact with a plant at the end of the minimum working stretch, in which case the stirrup 46 may again be pulled up by the stop relay 45 and there is then nothing to stand in the way of further rotation of the control disc 28. If, on the other hand, the feeler 26 has not made contact with any plant at the end of the minimum working stretch, the control disc 28 is again stopped until the feeler 26 makes contact with a plant beyond the minimum working stretch.

While the control disc 28 is stopped, the sliding contact 31 remains in engagement with the disc sector 30b and the hoeing tools 23 therefore also maintain their operative position. If a plant is again contacted by the feeler 26, the control process described is repeated.

In the embodiment shown in FIGS. 4 and 5, the end surface of the control disc 28 is in the form of a relief. It has a depression 96 in the region of the sector 30a corresponding to the protected zone $a$ and an elevation 97 in the region of the sector 30b corresponding to the minimum working stretch $b$. In this embodiment, the switching means consist of a microcontact 98 which has a roller lever 99 which engages with the said relief surface of the disc. The microcontact 98 is wired up in such a manner that it closes a circuit when its roller lever 99 is in the region of the disc sector 30a.

In the embodiment shown in FIGS. 6 and 7, the control disc 28 has a recess 100. This recess 100 forms the control disc sector 30a corresponding to the protected zone $a$. This sector 30b which corresponds to the minimum working stretch $b$ is formed by the end surface of the remaining part of the control disc 28. In this embodiment, the control means are a source of light 101 and a photoelectric cell 102 arranged on either side of the control disc 28. When the recess 100 of the disc 28 is in the region of the source of light 101 and photoelectric cell 102, a current flows through the cell 102.

The embodiment according to FIGS. 8 and 9 has the same control disc 28 as that of FIGS. 6 and 7. In this embodiment however, the switching means are pneumatic and comprise a pressure pipe 103 with a nozzle 104 opening close to the end surface of the control disc. When the recess 100 of the control disc 28 enters the region of the nozzle 104 of the pressure pipe 103, there is a pressure drop in the pressure pipe, and this pressure drop can be indicated by a measuring instrument 105. This pressure drop is utilised for further control.

Figure 10:
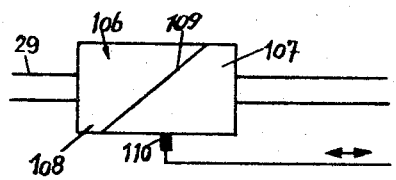
FIG. 10 shows a control roller and switching means cooperating therewith, in partial view.

A control roller 106 is shown in FIG. 10, which can be used instead of the control disc 28, is also mounted on the drive shaft 29. It has two different circumferential areas 107 and 108 whose line of intersection 109 extends at a constant angle to the transverse direction of the roller. The circumferential part 107 is covered with a metal layer (not shown) and consequently conductive. Its circumferential lines correspond to the protected zone $a$. The circumferential part 108, on the other hand, is not conductive and its circumferential lines correspond to the minimum working stretch $b$. A sliding contact 110 corresponding to the sliding contact 31 of FIG. 2 engages with the circumferential surface of the control roller 106 and is displaceable parallel to the axis of the roller. The mode of operation of the control roller 106 corresponds to that of the control disc 28 of the embodiment of FIG. 2, which has already been described.

What we claim is:

1. In a row type agricultural machine having working implements selectively operable for working on discrete portions of a working stretch of a row of plants and having means for selectively deactivating the implements to create a protected non-worked zone, the improvement comprising a control means including rotary control disc formed with first and second control sectors of radially varying extents respectively corresponding to the protected stretch and the working stretch, drive means for rotating said control disc, radially adjustable means supporting switch means laterally adjacent one end surface of said control disc and operable when adjacent said first sector through a control circuit for deactivating said working implements but operable through said control circuit when adjacent said second sector for activating said working implements.

2. Apparatus as defined in claim 1, wherein said control disc includes a stop surface on its periphery, a pivoted lever member adjacent the periphery of said disc having a free end portion normally spring biased into holding engagement with said stop surface to hold said control disc against rotation, and an electro-magnet associated with said stop lever member for withdrawing the same from holding engagement with the associated stop surface upon actuation of the electro-magnet.

3. Apparatus as defined in claim 2, wherein the electro-magnet and associated stop lever member associated with said control disc are supported on a frame member pivotally supported for angular movement about the axis of rotation of the control disc for adjustment to different selected angular positions.

4. Apparatus as defined in claim 2, including an electric feeler member positioned a selected distance in advance of the working implements along the direction of travel of the apparatus, and control circuit means for said electro-magnet intercoupled with said feeler member and said electro-magnet for energizing the electro-magnet upon contact of the feeler member with the plants.

5. Apparatus as defined in claim 4, wherein said control circuit means includes transistor amplifier means for amplifying current flow through said feeler member upon contact of the latter with plants and switch means activated by said amplifier means for energizing said electro-magnet.

6. Apparatus as defined in claim 4, including a transformer having first secondary coil means connected to said feeler member for supplying current to the same, and a potentiometer connected in parallel with said first secondary coil means for varying the sensitivity of said feeler member.

7. The invention of claim 1, wherein the ratio of the lengths of arcs of the two control sectors differ in accordance with the radial distance from the axis of the control disc.

8. The invention of claim 7 including a stop device for said control disc, which stop device holds the control disc in an angular position at which a switching effect keeping the working implements in the operative position is exerted by the switching means and deactivating means operable in response to the detection of a plant for deactivating said stop device to release the control disc so that the working implements are subsequently deactivated.

9. The invention according to claim 8, including adjustable support means for supporting said stop means in varying positions so as to vary the angular position in which the control disc is stopped by the stop device.

10. The invention of claim 9 wherein said first sector is formed of an electrically conductive surface and the second sector is formed of an electrically non-conductive surface, the switching means including a sliding contact engaging with the end surface of the disc so as to sequentially engage said control sectors.

11. The invention of claim 10, wherein each control disc consists of dielectric material and is covered with a metal layer in the region of the sector corresponding to the conductive surface.

12. The invention of claim 9, wherein the one end surface of each control disc which is adjacent the switching means is a relief surface having a depression in the first sector corresponding to the protected zone and an elevation in the second sector corresponding to the working stretch, the switching means being formed by a microcontact which has an actuating lever engaging with the one end surface of the disc.

13. The invention of claim 9, wherein the one end surface of each control disc which faces the switching means has a relief surface having a depression in the region of the first sector corresponding to the protected zone and an elevation in the region of the second sector corresponding to the minimum working stretch and wherein said switch means comprises pneumatic switching means including a nozzle terminating closely adjacent said end surface.

14. The invention of claim 9, wherein each control disc has a recess in the region of the first sector corresponding to the protected zone, and the switching means includes a photoelectric cell and a source of light arranged on opposite sides of the control disc.

15. The invention of claim 9, wherein each control disc has a recess in the region of the first sector corresponding to the protected zone, and the switching means comprises pneumatic switching means having a nozzle terminating close in front of the one end surface of the disc.

16. The invention of claim 9, wherein said control disc is driven by way of a slip coupling.

References Cited

UNITED STATES PATENTS

| 1,519,198 | 12/1924 | Franke | 172—6 |
| 2,507,001 | 5/1950 | Ferte | 172—6 |
| 2,535,720 | 12/1950 | Boncompain | 172—6 |
| 2,682,132 | 6/1954 | Marihart | 47—1 |

ROBERT E. BAGWILL, Primary Examiner.

U.S. Cl. X.R.

47—143; 172—94